F. BRADLEY & F. H. FAIRCHILD.
VEHICLE WHEEL.
APPLICATION FILED MAR. 26, 1906.
924,139.
Patented June 8, 1909.
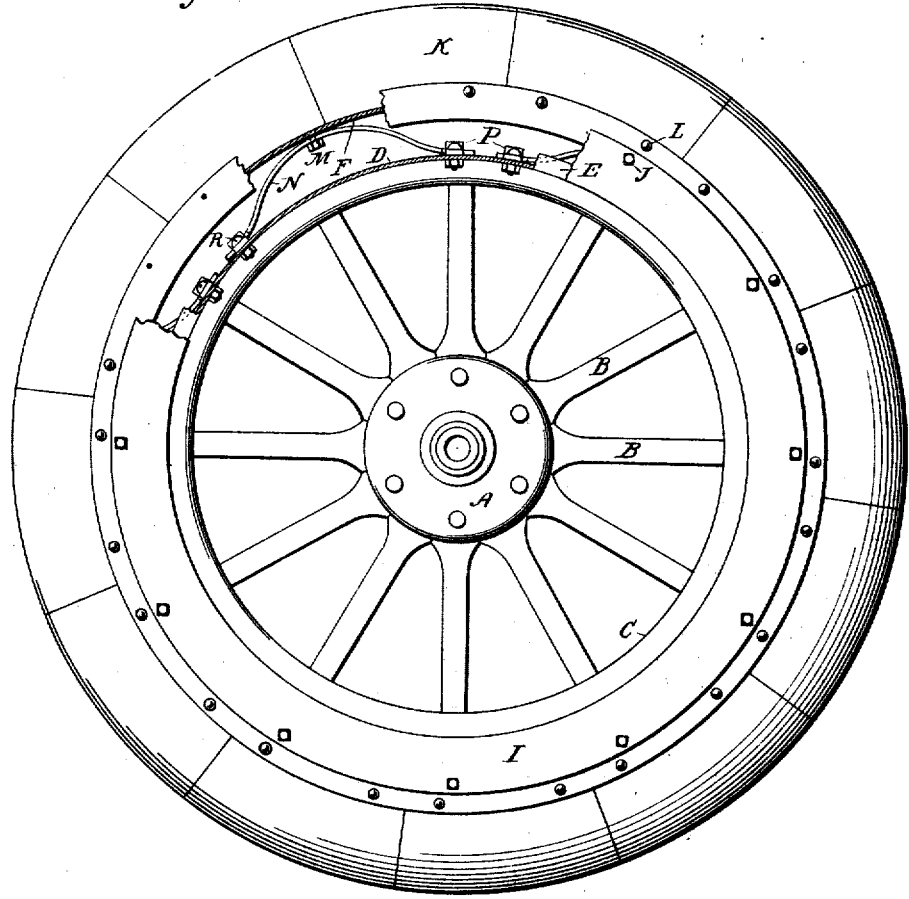
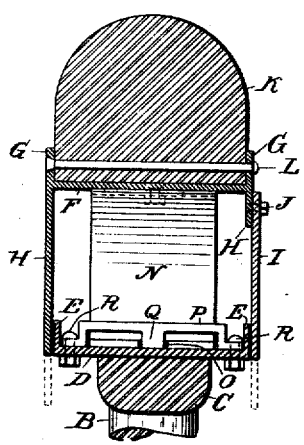
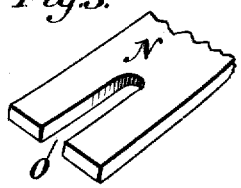
WITNESSES:
Chas. B. Shumway
Oliver C. Barthel
Frank Bradley
Frank H Fairchild
INVENTORS
BY
ATTORNEYS

UNITED STATES PATENT OFFICE.

FRANK BRADLEY AND FRANK H. FAIRCHILD, OF DETROIT, MICHIGAN, ASSIGNORS OF ONE-THIRD TO CHARLES C. BRADLEY, OF MOUNT CLEMENS, MICHIGAN.

VEHICLE-WHEEL.

No. 924,139.   Specification of Letters Patent.   Patented June 8, 1909.

Application filed March 26, 1906. Serial No. 307,959.

*To all whom it may concern:*

Be it known that we, FRANK BRADLEY and FRANK H. FAIRCHILD, citizens of the United States of America, residing at Detroit, in the county of Wayne and State of Michigan, have invented certain new and useful Improvements in Vehicle-Wheels, of which the following is a specification, reference being had therein to the accompanying drawings.

This invention relates to new and useful improvements in vehicle-wheels and has for its object to provide a wheel which combines all the advantages attained by the use of a pneumatic tire without its objectionable features, and which shall be light, strong, inexpensive to manufacture and easy of access in case of repair.

A further object of the invention being to so arrange the springs that they form the sole connection between the inner and outer wheel rims and to provide means whereby the springs are supported against lateral strain and at the same time protected from injury and the elements all as more fully hereinafter described and shown in the accompanying drawings, in which Figure 1, is a side elevation of a wheel embodying our invention, parts being broken away to show the interior construction; Fig. 2, is a transverse section through the outer portion of the same; Fig. 3, is a perspective view of the slotted end of one of the springs.

As shown in the drawings A is the hub, B the spokes and C the felly of an ordinary artillery automobile wheel all of well known construction.

D is an inner rim secured to the felly and provided with radial flanges E. F is an outer rim provided with flanges G H extending at right angles to and on opposite sides of the rim, one of the flanges H being of a length to lap the flange E and I is an annular plate removably secured to the short flange H by bolts J said plate being of a width to lap the other flange E so that the standing flanges of the inner and outer rims are free to have a sliding engagement upon each other capable of resisting lateral strain.

K is the tire preferably made of wood in sections with the grain running edgewise and adapted to be secured between the flanges G by the bolts or rivets L.

Secured to the inner face of the outer rim by countersunk bolts M are the semi-elliptic springs N provided with slots O at their opposite ends. P are clips straddling the opposite ends of the springs and provided with fingers Q loosely engaging said slots. R are bolts passing through apertures on the opposite sides of the clips and inner rim for securing the parts together.

The springs N being free to have a limited sliding engagement with the clips P and thus forming the means for transmitting motion from the inner to the outer rim or vice versa and yet forming a yielding connection therebetween.

It will thus be seen that with our construction a very durable, cheap and resilient wheel is obtained, all of the parts being readily accessible by loosening the bolts J permitting the removal of the plate I.

Having now fully described our invention, what we claim is:—

1. A vehicle wheel comprising a hub and spokes, a rim of channel iron secured on the spokes with the flanges disposed outwardly, an outer rim having annular marginal flanges adapted to slidingly engage the flanges of the inner rim, a plurality of semi-elliptic springs interposed between the rims and rigidly secured at their centers to the outer rim, a slot in each end of each spring, a clip secured on the inner rim bridging the end of a spring, a dependent lug on the clip engaging the slot in the spring end and a tire secured on the outer face of the outer rim.

2. A vehicle wheel comprising a hub and spokes, a rim secured on the spokes having radial flanges, an outer rim having inwardly extending flanges disposed to slidingly engage the flanges of the inner rim, a plurality of semi-elliptic springs interposed between the rims, and secured at their centers to the inner face of the outer rim, a longitudinal slot in each end of each spring, a clip bridging the end of each spring, bolts securing said clip at its ends to the outer face of the inner rim, a dependent lug on the clip engaging the slot of the spring end, and a tire on the outer rim.

In testimony whereof we affix our signatures in presence of two witnesses.

FRANK BRADLEY.
FRANK H. FAIRCHILD.

Witnesses:
OTTO F. BARTHEL,
OLIVER E. BARTHEL.